2 Sheets--Sheet 1.

H. G. HALL.
Churns.

No. 155,083.  Patented Sept. 15, 1874.

WITNESSES.  
F. H. Schott.  
C. L. Evert.

INVENTOR  
Harvey G. Hall,  
By Alexander Mator  
Attorneys.

2 Sheets--Sheet 2.

H. G. HALL.
Churns.

No. 155,083. Patented Sept. 15, 1874.

WITNESSES.
F. H. Schott.
C. L. Evert.

INVENTOR
Harvey G. Hall
By Alexander Mator
Attorneys.

UNITED STATES PATENT OFFICE.

HARVEY G. HALL, OF LUZERNE, NEW YORK.

IMPROVEMENT IN CHURNS.

Specification forming part of Letters Patent No. 155,083, dated September 15, 1874; application filed June 3, 1874.

*To all whom it may concern:*

Be it known that I, HARVEY G. HALL, of Luzerne, in the county of Warren and in the State of New York, have invented certain new and useful Improvements in Churn; and do hereby declare that the following is a full, clear, and exact description thereof, reference being had to the accompanying drawings and to the letters of reference marked thereon, making a part of this specification.

The nature of my invention consists in the construction and arrangement of the several devices hereinafter described for forming a churn-power.

Figure 1:
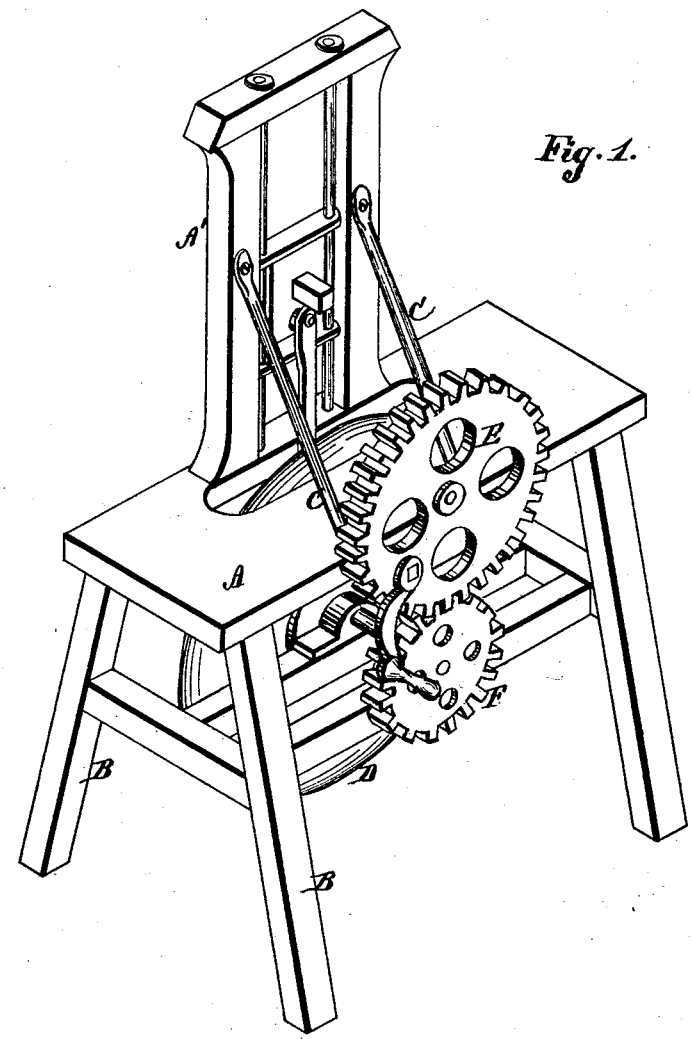
Figure 2:
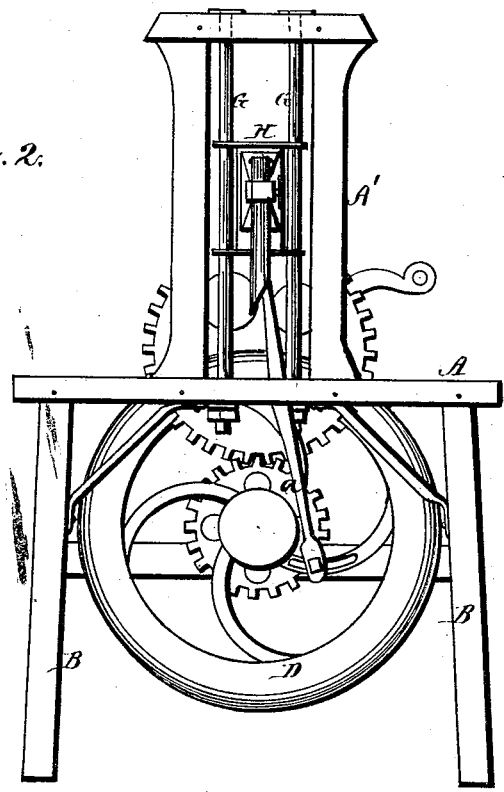
Figure 3:
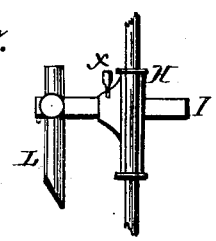
Figure 4:

In the annexed drawings, Figure 1 is a perspective, Fig. 2 a side view, and Figs. 3 and 4 detached views, of my invention.

In the figures, A is a stand, which is provided with the legs B B. Upon the stand A is erected the frame A', and between the standards of this frame are two guide-rods, G G. Between these guide-rods is a cross-head, H, which has a vertical reciprocating motion. A pitman, *a*, connects the cross-head H to a slotted arm in a balance-wheel, D. The balance-wheel is driven by means of the two gear-wheels E and F, one of which is provided with a suitable crank. The cross-head H is provided with a square opening through which passes a square bar, I. The outer end of the bar I, which is in a horizontal position, is provided with a hole, through which passes the staff of an ordinary churn. The bar I is adjustable in the cross-head H—is adjustable endwise, so that the churn may be placed close to or at any desired distance from the power. A set-screw, *e*, secures the staff in the opening in the bar. The curved slot in the arm of the balance-wheel regulates the length of the stroke of the dasher-staff.

The size and proportion of the frame and other portions of this power are not of my invention, and I do not claim the general power itself; but What I do claim is—

The combination of the cross-head H, provided with a suitable opening, the bar I, and its set-screw *x*, the dasher-staff and its set-screw, and the pitman *a*, and slotted arm in the balance-wheel, all for regulating the dasher-staff with reference to stroke and distance from the power, as herein set forth.

In testimony that I claim the foregoing I have hereunto set my hand this 14th day of May, 1874.

HARVEY G. HALL.

Witnesses:
 T. B. BURNESON,
 WARREN HALL.